United States Patent Office 3,371,785
Patented Mar. 5, 1968

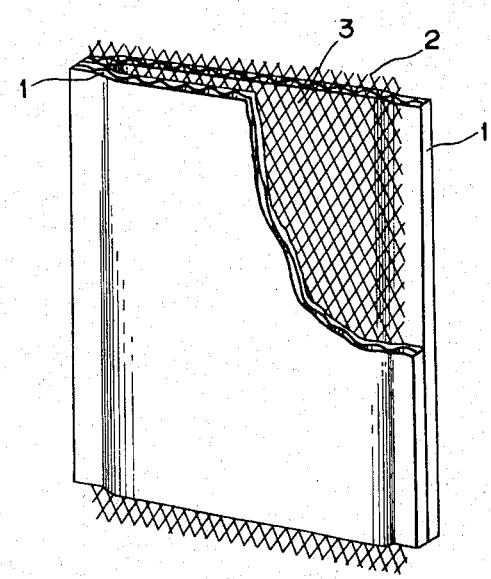

3,371,785
METHOD OF DEHYDRATING SLUDGE
Yuiti Hanami, Tokyo, Japan, assignor to Kurita Industrial Co., Ltd., Osaka-shi, Japan, a corporation of Japan
Filed June 13, 1966, Ser. No. 556,946
Claims priority, application Japan, June 19, 1965, 40/36,447; Oct. 22, 1965, 40/64,853; Dec. 17, 1965, 40/77,927
4 Claims. (Cl. 210—65)

ABSTRACT OF THE DISCLOSURE

A method for rapidly dehydrating sludge by inserting into a layer of sludge containing fur or highly hygroscopic, colloidal solids formed during water-treatment procedures, a strip made of a liquid-pervious material having numerous fine passageways and spacer means, with one end of said strip protruding below the bottom of said sludge layer, or with both ends thereof protruding above and below the upper and lower surfaces of said sludge layer.

---

The present invention relates to a method of quickly dehydrating and drying sludge containing fur or very fine colloidal solid matter which are formed during treatment of water.

Sludge is formed during so-called water treatment which includes water purification at waterworks, treatment of water for use in industries, treatment of waste water or filthy water discharge from factories, or is formed in factories handling clay. Such sludge is comprised of fine solid matter existing in colloidal form suspended in water or like fluid, and the greater portion of the sludge consists of water or like fluid. As such, a great difficulty has been encountered, in various fields of industries, in the removal of water or moisture from sludge.

Dehydration of sludge has heretofore been carried out either by the natural drying method which is seen in waterworks plants where sludge formed on the bed of pebbles is exposed to natural air to be dried, or by a mechanical dehydration method which uses Oliver-type dehydrating machines, centrifugal dehydrating machines or like means. The former method requires extensive facilities and also a long period of time, while the latter method has a disadvantage in that the weave of the filtering cloth becomes clogged with the particles of sludge on account of the fact that the solid matter constituting the sludge is comprised of fine particles in colloidal form, with a result that there arises an increased filtering resistance and also that a tremendous amount of effort is consumed for the scraping off of the cake adhered to the surfaces of the filtering cloth. Thus, an efficient dehydrating operation could not have been expected from these prior methods.

Another sludge dehydration and drying method of the prior art employs a blower which is operative so as to coercively apply heated air onto a layer of sludge of an appropriate thickness. However, while dehydration of sludge is conducted by this latter method, there occurs a sudden drop in the rate of evaporation of moisture contained in the sludge with the progress in the degree of evaporation, and besides, this latter method requires a large site in order to obtain a large, effective surface of evaporation, in view of the fact that the evaporation of the moisture takes place at the surface of the layer of sludge and because the reduction in the moisture content of the sludge due to progressive evaporation gradually causes a firm film of dried substances to be formed at the surface of the sludge, and this prevents the moisture contained in the inner portion of the sludge from coming up to the surface thereof for being evaporated. As a result, during the process of dehydration, there occurs a severe drop in the rate of evaporation even when the sludge itself still contains therein a substantial amount of moisture.

In order to improve such difficulties of the prior art, a method of accelerating the evaporation and drying of sludge by inserting an instrument having capillary action into the layer of the sludge to thereby lead the moisture to the surface of the layer at which the moisture evaporates, has been proposed. However, this method is not satisfactory because a great deal of time is required for completely evaporating the layer of moisture formed on the surface of the sludge during the incipient stage of the dehydration process.

It is, therefore, the primary object of the present invention to provide a method for quickly removing the moisture formed on the surface of sludge.

Another object of the present invention is to provide a method of conducting effective dehydration and drying of sludge even when a film is formed on the surface of the sludge due to a reduced content of moisture in the sludge.

Still another object of the present invention is to improve the dehydration efficiency by the particular designs of the dehydrating and drying instrument to be inserted in the layer of sludge.

Other objects and advantages of the present invention will become apparent by reading the following detailed statement.

The present invention is characterized by the provision of a method of dehydrating and drying sludge which is conducted by inserting into the layer of sludge an instrument having capillary action, with one end of the instrument protruding from one edge of the layer of the sludge or with both ends of the instrument protruding from both edges of the layer, respectively. The instrument having capillary action is made of a material which includes cardboard, felt, sponge or the like. The dehydrating instrument of the preferred type has hollow portions formed inside thereof, such as the internal passages formed by the corrugating medium in corrugated board, so that these inside hollow portions serve as the channels or passageways for the moisture to travel therethrough. Such dehydrating instrument is used in the form of an elongated flat strip so that it may have a large surface area.

The present invention will be more clearly understood by reading the following detailed description in conjunction with the accompanying drawing, which shows one example of the instrument having capillary action which is used in the present invention.

The dehydration efficiency is further accelerated by the use of such a dehydration instrument which comprises two sheets 1 of a material having capillary action and a spacer 2 which is sandwiched between these two sheets. The dehydration instrument may be constructed in such manner that the spacer 2 is located in a sheet of capillary material prepared in a cylindrical form. In either type of the dehydration instrument, both the upper and the lower edges of the instrument or strip are not closed so that the inserted spacer can protrude from these edges. The spacer is used so as to provide passageways 3 or channels in the hollow portions between the facing sides of the capillary material constituting the dehydrating instrument so that the moisture can travel through. For this purpose, the spacer is made to have a structure to provide a vertically extending clearance between the facing surfaces of the capillary material. The spacer is preferably made of a material which has an anti-corrosive property and which will not become swollen when contacted by moisture. The spacer may be a corrugated plate or a reticulated plate.

The dehydrating method of the present invention will now be described. One or more strips of the dehydrating instrument are inserted vertically into a layer of sludge, said instrument comprising either a strip of material having capillary action, or a strip of material having internal hollow portions which serve as the moisture passageways, or a strip of material having a spacer or spacers sandwiched therein. The strip is inserted into the layer of sludge so that the lower end of the strip protrudes below the lower edge of the layer of sludge, while the upper end of the strip at least reaches the upper edge of the layer of the sludge. Preferably, the upper end of the strip protrudes beyond the upper edge of the sludge. Upon insertion of the strip into the layer of the sludge, the moisture contained therein starts infiltrating into the tissue of the strip material and falls in drips from the lower end of the strip. Where a strip having interior hollow portions serving as the moisture passageways or a strip having a spacer sandwiched therein is inserted into a layer of sludge, the moisture contained in said sludge infiltrates into the tissue of the strip having capillary property, passes down the passageways, and falls from the edge of the strip in drips.

In case a layer of moisture is formed on the surface of the layer of sludge, the instrument strip, which is inserted into the sludge deep enough so that the tip of the instrument reaches the surface of the sludge, will cause the moisture to infiltrate into the tissue of the strip and flows down rapidly through the passageways to be drained therefrom.

In particular, by the use of a strip of dehydrating instrument of the structure having two reticulated plates disposed in juxtaposition, with the meshes of one being slightly offset with the meshes of the other, and sandwiched between two facing sides of a capillary material, the rate of dehydration is accelerated further than is attained by the instrument of the type having only one reticulated spacer sandwiched therein.

In an air dry bed, a layer of sludge is formed usually on the surface of the supporting layer which consists of pebbles or sand. In such case, efficient dehydration of the sludge is accomplished by inserting one or more dehydration strips into the layer of the sludge in such manner that the lower end of the strip passes through the layer of sludge and enters into the supporting layer of pebbles or sand locating beneath the layer of sludge. The dehydration and drying of sludge will be further accelerated by inserting one or more such strips into the layer of sludge, with the lower end of the strip being passed into the layer of pebbles, and with the upper end of the strip protruding beyond the upper edge of the layer of sludge so that said instrument has a portion exposed to the atmosphere in order that the moisture may evaporate at such portion of the instrument exposed to the ambient air. By so disposing the strip into the layer, the evaporation of the moisture from the instrument continues even after the layer of fluid locating on the upper surface of the layer of sludge has been completely drained through the passageways formed in the instrument. More particularly, the moisture within the sludge infiltrates into the tissue of the instrument by virtue of the capillary action of the material of the instrument so as to evaporate at the aforesaid portion of the instrument protruding upwardly into the atmosphere and this evaporation continues until substantially all of the moisture contained within the sludge has been removed. The evaporation of the moisture, through the upward protrusion of the instrument is further accelerated by passing dry or heated air onto the upwardly protruding portion of the instrument. The upward portions of the instrument protruding upwardly and/or downwardly beyond the edges of the layer of sludge are of a length ranging from 5 to 20 cm., and such strips of dehydrating instrument should be distributed into the entire layer of sludge at substantially uniform intervals relative to each other.

In case the sludge is of a low concentration, that is, when the moisture content is as great as 90% or more, it has been difficult to perform dehydration of such sludge in one step with a conventional dehydration method. The prior method required a preliminary step to increase the concentration of the sludge. In contrast to such complicated prior art, the present invention permits a rapid dehydration of sludge of a low concentration in one step without the need of a preliminary treatment.

In order that the usefulness of the present invention may be better understood, some of the embodiments of the present invention will be described. It is needless to say that these embodiments are given simply by way of example and that the present invention is not restricted thereto.

*Example 1*

Sludge specimens comprising aggregated sediments of mud with a moisture content of 86% collected at a water purifying plant were placed into columns having an inner diameter of 66 mm. and a length of 150 mm. to a depth of 140 mm. Into each of these specimens was inserted a strip of cardboard of a size of 3 mm. (thickness) x 50 mm. (width) internally having hollow portions each portion being of a size of 1 mm. x 2 mm. The lower end of the strip was made to protrude about 5 cm. outside the column through a slit of 3 mm. x 50 mm. formed at the bottom of the column. Under these conditions, the relations between the lapse of time and the changes in the moisture content of the sludge (A) in case the upper end of the strip of cardboard protruded upwardly beyond the upper surface of the layer of the sludge and (B) in case the upper end of the strip located at the surface level of the layer of sludge, are shown in the following Table 1. For the sake of comparison, the result (C) obtained when a strip of cardboard was not inserted and the result (D) when only the upper end of a strip protruded upwardly beyond the edge of the column are also shown in the same table.

TABLE 1

| Column | Moisture content (percent) | |
| --- | --- | --- |
| | In 2 hrs. | In 24 hrs. |
| A | 80.5 | 71.6 |
| B | 80.5 | 75.8 |
| C | 85.9 | 85.0 |
| D | 85.6 | 83.1 |

*Example 2*

Experiment was conducted under substantially the same conditions as those for Example 1, excepting: that the upper end of the strip protruded upwardly about 6 cm. beyond the upper surface of the layer of sludge, that the lower end of the strip protruded downwardly about 5 cm. from the slit of 3 mm. x 50 mm. provided at the bottom of the column and also that air was passed onto the upper portion of the column at the rate of about 4 m. per second. Dehydration of the specimens was conducted under these conditions (A). For comparison, the result (B) where no strip was inserted and the result (C) where a strip of cardboard was inserted with only the upper end protruding upwardly from the upper surface of the layer of sludge and the result (D) where only the lower end of the inserted strip of cardboard protruded downwardly outside the column were also obtained. The relations between the lapse of time and the changes in the moisture content are shown in the following Table 2.

TABLE 2

| Column | Moisture content (percent) | | |
| --- | --- | --- | --- |
| | In 2 hrs. | In 24 hrs. | In 72 hrs. |
| A | 80.5 | 71.6 | 53.2 |
| B | 85.9 | 85.0 | 82.6 |
| C | 85.6 | 83.1 | 69.3 |
| D | 80.5 | 75.8 | 74.2 |

*Example 3*

Specimens comprising aggregated sediments of mud with moisture content of 96% were dehydrated under the same condition as for Example 2. The result classified as (A) is shown in Table 3 together with the result (B)

where a strip of cardboard was inserted in the layer of sludge with only the upper end of the strip protruding upwardly from the layer.

TABLE 3

| Column | Moisture content (percent) | |
|---|---|---|
| | In 8 hrs. | In 24 hrs. |
| A | 86.4 | 75.8 |
| B | 95.7 | 95.15 |

*Example 4*

Columns each having an inner diameter of 66 mm. and a length of 150 mm. were filled with water to a depth of 140 mm. Into each of these columns was vertically inserted one of the following strips of cardboard having a width of 50 mm. and:
(1) having a thickness of 2 mm.,
(2) having a thickness of 3 mm. and having hollow moisture passageways of 1 mm. x 2 mm. formed longitudinally in the interior of the strip,
(3) having a thickness of 2 mm. and constructed with two strips of cardboard placed in juxtaposition sandwiching therebetween a reticulated vinyl chloride plate with meshes of 5 mm. as shown in the drawing,
(4) having the same construction with that described in (3), excepting that two similar reticulated plates disposed in juxtaposition with the meshes of one being slightly offset with the meshes of the other are sandwiched between two strips of cardboard,
with the upper end of each strip protruding about 5 cm. above the surface of the water, and the lower end protruding about 5 cm. from the slit at the bottom of the column.

The water in each column infiltrated into the tissue of the strip and flowed down from the lower end of the strip. During the experiment, additional water was supplied into the columns to keep the water levels constant. The relations between the lapse of time and the quantities (cc.) of the water collected from the bottom of the respective columns are shown in the following Table 4.

TABLE 4

| Column | Amount of collected water (cc.) | | | | | |
|---|---|---|---|---|---|---|
| | In 30 min. | In 60 min. | In 120 min. | In 180 min. | In 240 min. | In 300 min. |
| 1 | | | | | | 13 |
| 2 | 255 | 495 | 930 | 1,320 | 1,680 | 1,980 |
| 3 | 360 | 690 | 1,135 | 1,950 | 2,565 | 3,180 |
| 4 | 510 | 980 | 1,700 | 2,430 | 3,160 | |

*Example 5*

The columns having the size used in Example 4 were filled to a depth of 140 mm. with sludge comprising aggregated sediments of mud having a moisture content of 98.6%. Into these columns were inserted the strips (2) and (4) used in Example 4, respectively, with the upper ends protruding about 5 cm. upwardly from the surfaces of the layers of sludge, and the lower ends protruding about 5 cm. downwardly from the slits of the bottoms of the columns, respectively. Dehydration was conducted under the aforementioned conditions. The relations between the lapse of time and the quantities (cc.) of water collected from the lower ends of the strips of the respective columns are shown in the following Table 5.

TABLE 5

| Column | Amount of collected water (cc.) | | | | | |
|---|---|---|---|---|---|---|
| | In 5 min. | In 10 min. | In 30 min | In 60 min. | In 90 min. | In 120 min. |
| 2 | 17 | 34 | 114 | 153 | 197 | 230 |
| 4 | 38 | 64 | 154 | 191 | 230 | 255 |

As is noted from these examples, when dehydration of sludge is conducted by inserting a strip having capillary action into the layer of sludge, the dehydration is accelerated to a great degree where the lower end of the strip is arranged to protrude outwardly from the bottom of the layer of the sludge, and a further efficiency of dehydration is noted when a strip internally having hollow portions as the passageways for the moisture and a strip having a spacer or spacers sandwiched therein is used.

There is no restriction in the moisture content of the sludge which can be dehydrated by the method of the present invention. A sludge having a concentration as low as the order from 85% to 99% can be dehydrated quickly. The quantity of the moisture which infiltrates into the tissue of the strips of dehydrating instrument can vary depending upon the magnitude of the head of the fluid and the capillary pressure. When the head is of a great magnitude, a large quantity of moisture infiltrates into the layer of the sludge. Also, when there is formed a layer of water on the upper surface of sludge, a large quantity of moisture infiltrates into the tissue of the strips. The moisture in the sludge is dehydrated as it is led downwards through the passages in the strips. In addition, when one end of the strip protrudes into the atmosphere above the upper surface of the layer of sludge, there takes place constant evaporation which contributes to further reduction in the moisture content of the sludge.

What is claimed is:
1. A method of dehydrating sludge, comprising:
providing a strip having upper and lower ends and which is made of a pair of opposing thicknesses of liquid-pervious material having a multitude of fine passageways formed therein for permitting water to flow therethrough by virtue of the capillary action of said fine passageways, and spacer means sandwiched between said thicknesses and providing spaces of relatively large volume between said thicknesses, said spaces being open at least at the lower end of said strip;
inserting said strip into a layer of sludge so that said strip extends downwardly through said sludge layer and the lower end of said strip protrudes downwardly from and extends below the bottom surface of said sludge layer into a receiving zone located below said sludge layer, and permitting the water in said sludge layer to pass through said thicknesses by capillary action and then flow rapidly downwardly through the spaces between said thicknesses to drain water in said sludge layer through the lower end of said strip into said receiving zone.
2. A method of dehydrating sludge according to claim 1, in which said strip is made of corrugated paperboard.
3. A method of dehydrating sludge according to claim 1, characterized in that said spacer means consists of a plate having downwardly extending passageways formed therein, said plate being disposed between said thicknesses of liquid-pervious material.
4. A method of dehydrating sludge according to claim 1, in which the upper end of the strip protrudes upwardly from and extends above the upper surface of the sludge layer.

References Cited

UNITED STATES PATENTS

| 1,573,673 | 2/1926 | Bronstein | 210—65 X |
| 2,314,573 | 3/1943 | Clark et al. | 261—107 X |
| 3,236,768 | 2/1966 | Litt | 210—406 X |

FOREIGN PATENTS

| 711,565 | 6/1965 | Canada. |
| 54,100 | 12/1937 | Denmark. |

SAMIH N. ZAHARNA, *Primary Examiner.*

REUBEN FRIEDMAN, *Examiner.*

J. L. DE CESARE, *Assistant Examiner.*